E. H. PALMER & W. S. KINSLEY.
E. M. & H. V. PALMER & W. H. ROBERTS, EXECUTORS OF E. H. PALMER, DEC'D.
REVERSING GEAR MECHANISM.
APPLICATION FILED AUG. 5, 1912.
1,212,250. Patented Jan. 16, 1917.
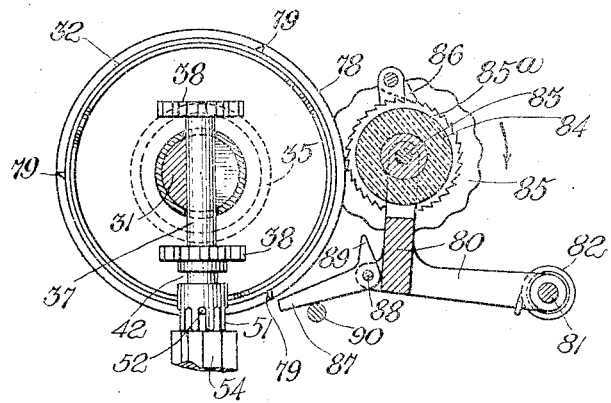
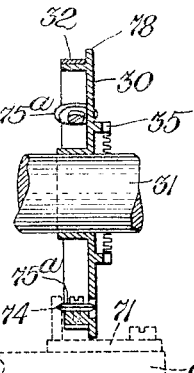
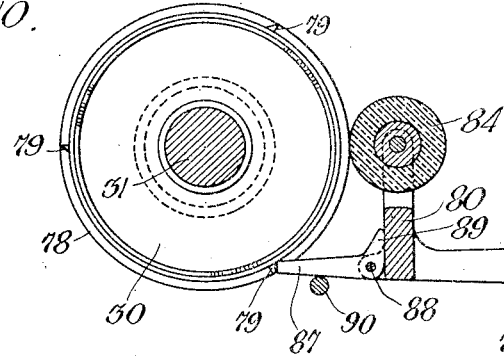
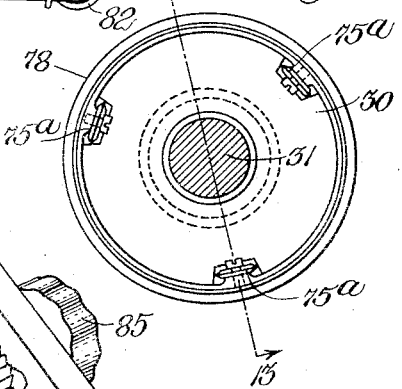
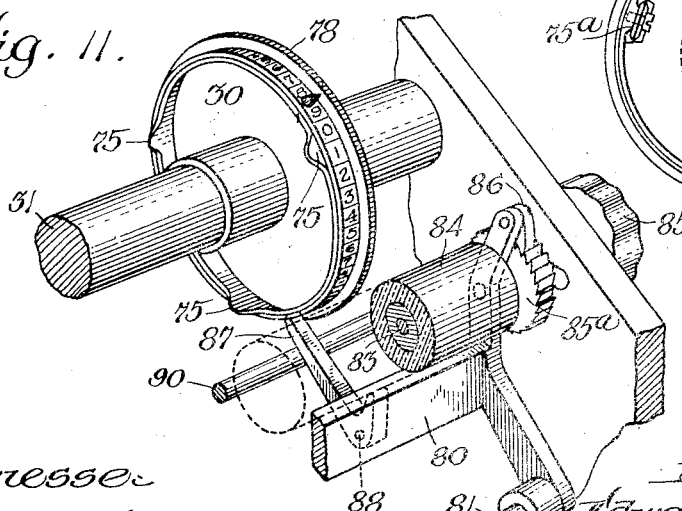

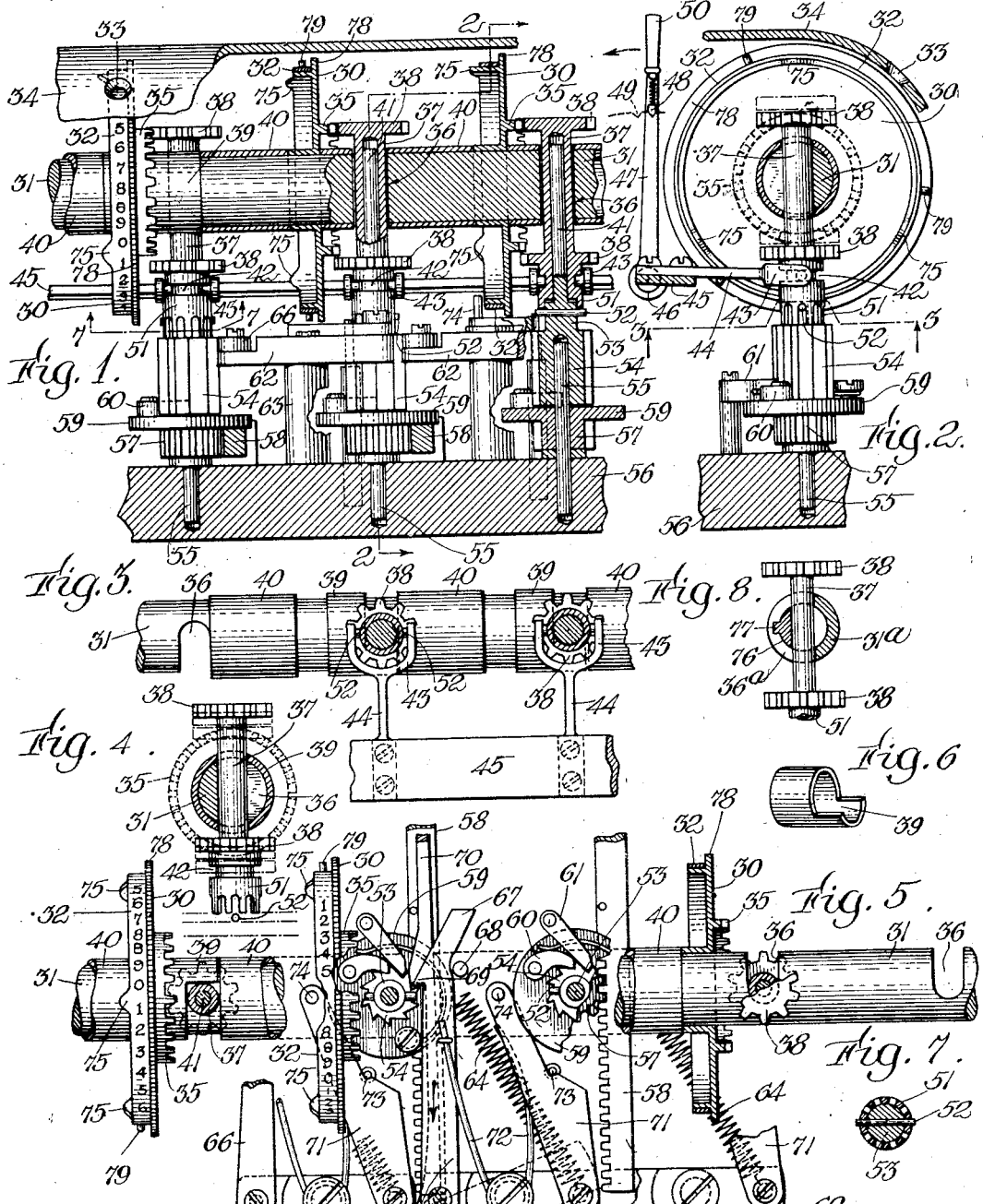

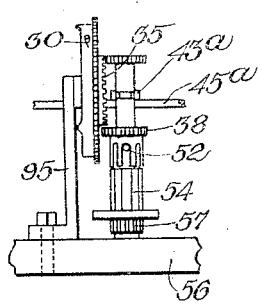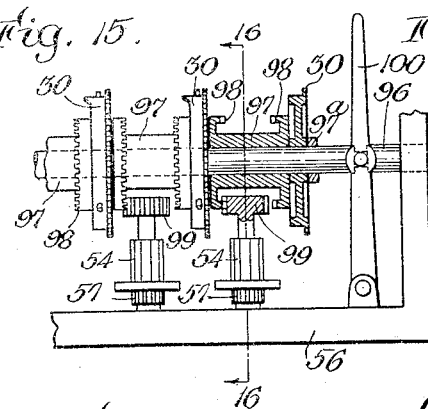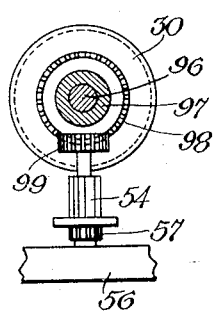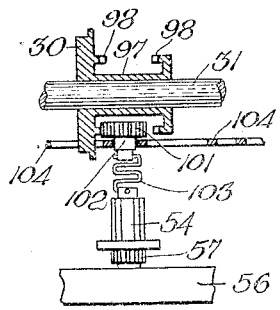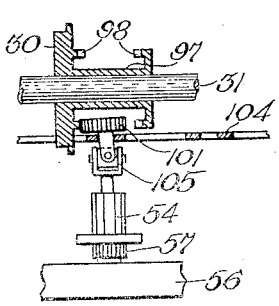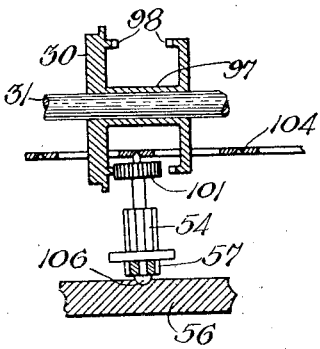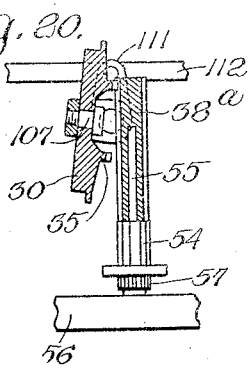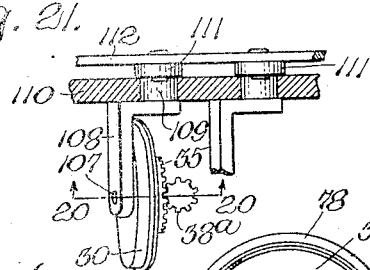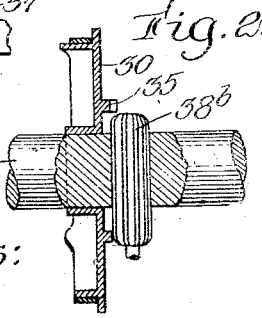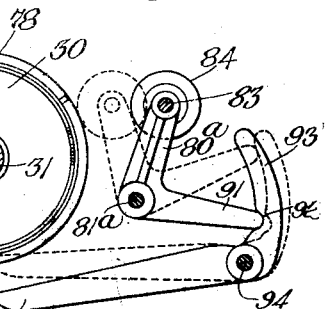

UNITED STATES PATENT OFFICE.

EDWARD H. PALMER AND WILLIAM S. KINSLEY, OF READING, MASSACHUSETTS; SAID KINSLEY ASSIGNOR TO SAID PALMER; EMILY M. PALMER AND HAROLD V. PALMER, BOTH OF READING, MASSACHUSETTS, AND WALTER H. ROBERTS, OF MALDEN, MASSACHUSETTS, EXECUTORS OF SAID EDWARD H. PALMER, DECEASED; SAID EXECUTORS ASSIGNORS TO EMILY M. PALMER AND HAROLD V. PALMER, INDIVIDUALLY.

REVERSING-GEAR MECHANISM.

1,212,250.     Specification of Letters Patent.     Patented Jan. 16, 1917.

Application filed August 5, 1912.     Serial No. 713,288.

*To all whom it may concern:*

Be it known that we, EDWARD H. PALMER and WILLIAM S. KINSLEY, citizens of the United States, and residents of Reading, in the county of Middlesex and State of Massachusetts, have invented certain new and useful Improvements in Reversing-Gear Mechanism, of which the following is a specification.

This invention relates to mechanism whereby rotary motion of a driving member may be quickly imparted to a driven member either forwardly or backwardly, the invention being especially adapted for calculating machines to provide for actuating counters in either direction to effect either addition or subtraction.

The principal object of the invention is to provide an improved reversing gear capable of a somewhat general application, further objects being to provide means whereby the said reversing gear can be utilized to enable sums to be added or subtracted, which means will now be described and claimed.

Of the accompanying drawings: Figure 1 is a front elevation, partly in section, showing the invention applied to a calculating machine; Fig. 2 represents a section on line 2—2 of Fig. 1; Fig. 3 represents a section on line 3—3 of Fig. 2; Fig. 4 is a view similar to a portion of Fig. 2, but illustrating a different adjustment of the pinions; Fig. 5 is a plan view of the mechanism shown in Fig. 1; Fig. 6 is a perspective view of one of the retaining collars; Fig. 7 represents a section on line 7—7 of Fig. 1; Fig. 8 is a view similar to a portion of Fig. 2, but illustrating a modification; Fig. 9 is a view similar to Fig. 2, but looking in the opposite direction and showing, partly in section, the mechanism for resetting the driven wheels to initial positions, said resetting mechanism being omitted from the preceding figures to avoid confusion; Fig. 10 is a view similar to Fig. 9, but showing the resetting roll in operative position; Fig. 11 is a perspective view of the resetting mechanism; Fig. 12 illustrates a modification of the carrying projections which move with the driven wheels; Fig. 13 represents a section on line 13—13 of Fig. 12; Fig. 14 is a somewhat diagrammatic elevation illustrating a modification of the reversing gear; Fig. 15 is an elevation, partly broken out or in section, of another modification of the reversing gear; Fig. 16 represents a section on line 16—16 of Fig. 15; Figs. 17, 18, 19 and 20 are views similar to Fig. 14, partly broken out or in section, of other modifications of the reversing gear; Fig. 21 is a plan view of the type of reversing gear shown in Fig. 20; Fig. 22 is a view similar to Fig. 20, showing another modification of the reversing gear; Fig. 23 is a view similar to Fig. 9, but illustrating a modification of the mechanism for resetting the driven wheels to initial positions. All of the Figs. 14 to 23 inclusive are somewhat diagrammatic, but include enough to explain the structures illustrated thereby.

Referring first to Figs. 1 to 7 inclusive, a series of wheels 30 are loosely mounted upon a cylindrical rod 31. In the embodiment illustrated, which is intended chiefly for calculating mechanism, the wheels are provided with peripheral bands 32 bearing numerals arranged in three series from 0 to 9. Said numerals are adapted to show successively through side openings 33 in a casing 34. Each wheel 30 is formed or provided with a crown gear 35. The rod 31 is provided with lateral recesses 36 (Figs. 3 and 5), the bottoms of which form bearings for the hubs or hollow spindles 37 having two pinions 38 spaced a little farther apart than the diameter of the crown gear 35. The hubs 37 are retained in the bearing recesses 36 by collars 39 slidably mounted on the rod 31, said collars being cut away, as best illustrated in Fig. 6, so that the projecting portions can extend past the hubs 37 (Fig. 5) to retain said hubs in the bottoms of the recesses 36. The collars 39, when moved to the position shown in Fig. 5, abut against collars 40 suitably fixed on the rod 31. This structure of the collars 39 is simple and convenient in assembling or disassembling, the latter being done by sliding the collars 39 along so as to open the recesses 36. It is to be understood, of course, that the collars 39 will be so constructed, or provided with such means, that they will retain proper positions for holding the hubs 37 in place.

The hubs or hollow spindles 37 are mounted upon rotatable pins 41 and are adapted to be clutched to said pins so as to be rotated thereby, as presently explained, or to be unclutched therefrom. The lower end of each hollow spindle is provided with an annular groove 42 which receives pins of a yoke 43 carried by an arm 44 projecting from a rock bar 45 suitably mounted in bearings 46 (Fig. 2) provided by portions of the frame of the machine not shown. The rock bar 45 has an arm or lever 47 provided with a detent 48 adapted to engage either one of a plurality of notches 49 provided in a fixed member forming a part of or secured to the frame of the machine. The lever or arm 47 has a handle 50 by means of which the bar 45 and its arms 44 may be shifted so as to raise or lower all of the hollow spindles 37 and their pinions 38, as illustrated by full and dotted line positions in Fig. 2.

The lower end 51 of the hollow spindle is somewhat enlarged and is provided with a series of ten crown teeth which coöperate with a pin 52 carried by a somewhat enlarged lower portion 53 of the pin 41. Below said enlarged portion 53 is a vertically elongated ratchet pinion 54. As shown in Fig. 1, the portions 41, 53 and 54 are integral. Obviously they might be separate, suitably secured together. The ratchet pinions are mounted on fixed pins 55 rising from the base 56, said ratchet pinions being separated from said base by spur pinions 57 rotatably mounted on the pins 55. Each spur pinion meshes with an actuating rack bar 58, which in the present illustrations might be termed the prime mover. When the invention is embodied in a complete calculating machine, the rack bars 58 are actuated by suitable mechanism, the amount of reciprocation imparted to each rack bar being according to the amount, from one to 9, that is to be added or subtracted. It is not considered necessary to illustrate or describe herein any particular means for reciprocating the rack bars 58.

Each spur pinion 57 has a disk 59 to which is pivoted a spring-pressed pawl 60 which engages the ratchet pinion 54 above said disk, a detent pawl 61 preventing return motion. It will now be understood that a reciprocation of either rack bar 58 to a greater or lesser extent will, during its movement in one direction, act through the pawl 60, engaging ratchet pinion 54, to rotate said pinion an amount which may be anywhere from one to nine. On the return motion of said rack bar the detent 61 holds the ratchet pinion 54 while the pawl 60 runs idly over the teeth of ratchet pinion 54. Of course the amount of rotative movement that is imparted to the ratchet pinion 54 is transmitted through the clutch comprising the pin 52 and toothed lower end 51 of the hollow spindle 37, to both of the pinions 38, both of the latter rotating in the same direction. The spindle 37 and its pinions 38 may be considered as one element constituting the driving member of the gearing, while the wheels, indicators or counters 30 constitute the driven member. The direction of rotation that will be imparted to the driven member will depend upon which of the pinions 38 is in mesh with the crown gear 35, since the points of meshing are diametrically opposite each other. As the driving member or element is movable relatively to the driven member or element so as to shift the driving engagement from one side to the other of the driven member, it is obvious that the structure is a simple reversing gear mechanism that is especially adapted to cause the series of numerals borne by the wheels to travel in one direction or the other to effect addition or subtraction. In the case of a plurality of these reversing gears it is often desirable, and in fact necessary in a calculating machine, that the motion of one wheel shall be carried over to the adjacent wheel. In the case of a calculating machine it is necessary that whenever the sum to be added to one wheel is sufficient to constitute ten or more, the next wheel shall be moved one step. This is so well known that it needs no further description.

We will now proceed to describe the carrying mechanism, referring particularly to Figs. 1 and 5. For each pair of wheels 30 there is a carrying lever 62 pivoted to a suitable supporting post 63, each carrying lever having a spring 64 so connected to it as to tend to swing said lever from the full line position of Fig. 5 to the dotted line position against a stop 65. Pivotally connected to one end of each lever 62 is a carrying arm 66, Fig. 5 showing but one of said arms. It is to be understood, of course, that there will be a carrying arm 66 for each carrying lever 62. The rear end of the carrying arm is inclined as at 67, one edge of said inclined end coöperating with a fixed guide pin 68 so that when said carrying arm is shifted in the direction of the arrow in Fig. 5 its tooth 69 will be firmly held in engagement with one of the teeth of ratchet pinion 54 during a sufficient length of stroke of the carrying arm to impart one tenth of a rotation to the ratchet pinion 54 that is engaged by said tooth.

It should be explained here that each ratchet pinion 54 is adapted to be rotated, by rack bar 58, through the pawl 60, a distance equal to any number of its teeth from one to nine. It is also to be understood that when a bar 58 is moved rearwardly it does so only to the extent which, upon return movement, will impart the desired amount of rotation to the ratchet pinion. In other words, the normal position of the rack bars 58 is illustrated in Fig. 5, and that while said bars may be moved rearwardly from that position, doing no counting when so moving, on their return to the position shown in said figure they effect the counting but never move forwardly beyond said position. To prevent over-motion of the ratchet pinions 54, we provide lock devices comprising a member 70 which moves with the rack bar 58, the extreme forward end of said member 70 wedging between the left-hand side of the inclined end 67 of the carrying arm and a tooth of the ratchet pinion 54 so as to lock said ratchet pinion against over-motion. Pivotally connected to the other end of each carrying lever 62 is a detent arm 71. Both arms 66 and 71 are caused to find their operative positions by force of a spring 72 coiled around the pivot 63 and suitably engaged at its ends with said arms. Each detent arm 71 is formed with a recess, one side of which provides a shoulder which coacts with a fixed stop 73 so that when such shoulder is in engagement with said stop the spring 64 will be stretched. In other words, each spring 64 tends to swing the carrying lever 62 from the full line position of Fig. 5 to the dotted line position whenever the detent arm 71 is pushed aside to disengage its shoulder from the stop 73. Devices that will be presently described act upon pins 74 carried by the detent arm 71 so that, when set for addition, this disengagement will occur whenever a wheel 30 brings a zero to the sight opening 33 so that the spring 64 of the released carrying lever will swing the latter to the dotted line position and cause the carrying arm 66 at the other end of said carrying lever to act through its tooth 69 to impart one step rotation to the next ratchet pinion 54 at the left, this motion being of course transmitted through the reversing gear mechanism described to the next numeral wheel at the left. When the mechanism is set for subtraction, the disengagement described will occur when the wheel, moving in the other direction, is bringing a "9" to the sight opening.

Each wheel 30 is provided with three cams or projections 75, either one of which is adapted to act upon the pin 74 to release the detent arm 71 for the purpose just mentioned. The reason for there being three of such cams or projections 75 for each wheel is that in the embodiment illustrated each wheel 30 carries three sets of numerals from 0 to 9. Consequently, for a computing machine, it is essential that there shall be a carrying effected by each one-third rotation of a wheel 30.

The description so far has referred especially to addition. If subtraction is to be effected the result can be obtained by simply actuating the lever 47 (Fig. 2) to shift its detent into the next notch 49. This results in all of the arms 44 raising or shifting the hollow spindles 37 to the dotted line position shown in Fig. 2 so that although the rotation that will be imparted by the prime movers or actuating rack bars 58 to the ratchet pinions 54 and the pinions 38 will be in the same direction as before, the motion that will be transmitted to the wheels 30 will be in the reverse direction and will consequently run the numerals in the downward scale and perform subtraction. The raising of the hollow spindles to the position shown by dotted lines in Fig. 2 will not disconnect the lower toothed ends 51 from the pins 52. The lever 47 may be moved to a farther point, however, so that the hollow spindles can be raised to the full line position shown in Fig. 4, which will then disconnect the lower toothed ends 51 from the 52 but still leave the lower pinion 38 in sufficient engagement with the crown gear 35 to render it certain that the parts can reassume proper meshing position. The reason why it is desirable to disconnect the lower toothed end 51 from the pin 52 is to enable all of the wheels 30 to be reset to initial or zero positions by the mechanism which we will presently explain. When such resetting has been effected the lever 47 will be returned so that the pinions 38 will occupy either the positions shown by full or dotted lines in Fig. 2 according to whether addition or subtraction is to be next effected. As a matter of fact when the invention is embodied in a calculating machine, there will be no occasion to effect subtraction after the wheels 30 are brought to zero or initial positions.

Before describing the resetting mechanism we will refer to Fig. 8, in which we illustrate a modification in the means for holding the hollow spindles in their bearings. In said figure we illustrate a tubular rod 31ª which takes the place of the rod 31 in Fig. 1, said tubular rod 31ª having recesses 36ª which receive the hollow spindles 37. To hold said spindles in place a key strip 76 is provided, said strip being slidable in from the end of the tubular rod, said strip being provided with a rib 77 entering a longitudinal groove in the inside of said tubular rod. The rib 77 is provided to prevent the key strip 76 from binding tightly against the sides of the hollow spindles 37 owing to the weight of said strip tending to cause said strip to slide downwardly.

We will now describe the means illustrated in Figs. 9, 10 and 11 for resetting all of the wheels 30 to their initial or zero positions. Each wheel is formed or provided with a flange 78 which may be milled or roughened on its periphery, there being also three equidistant peripheral pins 79, as shown also in Figs. 1, 2 and 4. A swinging frame 80 mounted to oscillate on a pivot rod 81, and normally held in the position shown in Fig. 9 by a spring 82, provides bearings for a shaft 83 having a plurality of friction rolls or a single friction roll of sufficient length, to simultaneously engage all of the flanges 78 of the wheels when the swinging frame is adjusted to the position shown in Fig. 10. A hand wheel 85 is provided to enable the operator to rotate the friction roll or rolls and to also provide means whereby the frame 80 may be swung downwardly from the position shown in Fig. 9 to the position shown in Fig. 10. A ratchet 85ª engaged by a spring-pressed pawl 86 carried by an arm of the frame 80 prevents manipulation of the friction roll or rolls in the wrong direction. The proper direction of rotation is indicated by the arrow in Fig. 9, and the direction of rotation that may be imparted to any or all of the wheels 30 that are then free to be rotated will be of course, as shown by comparing Figs. 9 and 11, in the direction of the progression or increase of the numerals borne by the wheels. Pivotally connected to the frame 80 are stops 87, there being one for each wheel 30. The pivotal points are indicated at 88. Said stops have heels 89 adapted to abut against the side of frame 80 when the frame is swung downwardly, the longer arms of the detents resting upon stops which may be provided for all of the stops by the rod 90. By comparing Figs. 9 and 10 it will be seen that when the frame is swung downwardly to bring the resetting roll or rolls 84 into contact with the flanges 78 of the wheels, the ends of the stops 87 will move upwardly into the path of movement of the pins 79 of the wheels. When this resetting mechanism is to be utilized swing the lever 47 (Fig. 2) so as to raise the hubs 37 and their pinions 88 to the position shown by full lines in Fig. 4, thereby disconnecting the lower toothed ends 51 of said hubs out of engagement with the pins 52. This frees all of the wheels 30 so that when the operator then grasps the hand wheel 85 and swings the frame downwardly to the position shown in Fig. 10 and then rotates the shaft and its friction hub or hubs in the direction indicated by the arrow in Fig. 9, all of the wheels 30 will be moved in the direction described until the pins 79 reach the ends of stops 87. Of course some of the wheels 30 will require more movement than others. The friction between the roll or rolls 84 and the wheels 30 will be such that after any wheel 30 is stopped as described the roll or rolls 84 will slip relatively to the wheel that has been stopped and continue to move other wheels 30 until all have been brought to initial or zero positions. Of course the pins 79 of the wheels 30 are so located relatively to the numerals borne by the counting or indicating wheels and relatively to the stops 87, that when a pin 79 reaches a stop 87, a zero or 0 will show through the sight opening 33.

Another and preferred mechanism for effecting the resetting described is illustrated in Fig. 23, in which the shaft 83 and its friction roll or rolls 84 are carried by a frame 80ª pivoted at 81ª, said frame having an arm 91 the end of which normally rests in a recess 92 of an arm 93 pivoted at 94 and provided with a plurality of stops 87ª, the ends of which are adapted to co-act with pins 79 carried by the wheels 30. The inner edge of the frame 93 above the recess 92 is curved substantially on an arc having its radii substantially corresponding to the length of the arm 91. Normally the parts will stand in the position shown by full lines in Fig. 23. When the operator swings the frame 80ª, as by means of a hand wheel similar to that shown at 85 in Fig. 9, to the dotted line position in Fig. 23, the upward movement of frame 91 first acts, by leaving the recess 92, to swing the arm 93 so that all of the stops 87ª will be moved up to the dotted line position, thus locating the stops 87ª in proper position well in advance of contact of the friction roll or rolls with the wheels 30. During the latter portion of the inward movement of the friction roll or rolls 84 the end of arm 91 simply rides along the inner curved surface of the frame 93. During this portion of the movement and also during the greater portion of the return or outward movement of the roll or rolls 84, the end of arm 91 still holds the arm 93 so that the stops 87ª remain in the dotted line position and avoid any risk of the wheels 30, or any of them, being shifted out of their reset positions.

It is to be understood that the operator, while manipulating the resetting mechanism described, will continue to hold the lever 47 (Fig. 2) so that the toothed lower end 51 of the hub of pinions 38 will remain out of engagement with the pin 52, as shown in Fig. 4, so that said toothed lower end can be rotated as the wheels 30 are rotated. The reason for there being ten teeth at the said lower end 51 is that when the lever 47 is released, after resetting the wheels 30 to initial or zero positions, there will be proper reëngagement with pin 52 no matter what rotative position may be occupied by the latter. As shown in Fig. 4, when the disengagement from pin 52 exists, there is still sufficient engagement of the lower pinion 38 with the crown gear 35 to render it certain that the parts can be restored to the positions indicated by full or dotted line positions of Fig. 2. Preferably the width of the pinions 38 is such that when being shifted from the full to dotted line position of Fig. 2, one pinion 38 will engage crown gear 35 just before the other leaves it. This is permissible because in practice with the embodiment of the invention illustrated in Figs. 1 to 7, the shift is made only when the driver (hub 37 and its pinion 38) is not rotating. Under such circumstances no harm will result if there is a brief double engagement while the movable member is being shifted. If the invention, however, be embodied in mechanism which renders it desirable that the shift shall be made while the driver is rotating, there must be a point or moment when there is complete disengagement between the driving and driven members, to avoid locking of the teeth or damage. The same will be true of some of the modifications of the gearing presently described.

Instead of providing the wheels 30 with fixed cams or projections 75, we may employ wheels 75$^a$ (Figs. 12 and 13), the wheels being mounted so that portions of their peripheries will project sufficiently to act against pins 74 of the detent arms in the manner hereinbefore described in connection with Figs. 1 and 5. Instead of mounting wheels 30 upon a single shaft or rod, each may be supported by a bracket 95 rising from the base 56, as shown in Fig. 14, in which figure we illustrate the rock bar 45$^a$ as in a plane between that of the upper and lower pinions 38, said rock bar having the yokes 43$^a$ engaging grooves substantially mid-way between said pinions.

In Figs. 15 and 16 we illustrate a modification, in which there is provided a cylindrical rod 96 mounted to be shifted slightly in the direction of its length as presently described. The wheels 30 are mounted loosely on said rod, each having secured thereto or integral therewith a hub 97 having at each end a gear 98, the teeth of said gears facing each other. The entire series of wheels 30 and hubs, although mounted to rotate on the rod 96, are held so as to be carried or shifted by said rod as presently described. In Fig. 15 a collar 97$^a$ is shown as secured to the rod, and it is to be understood that a similar collar is secured at the other end of the series. The ratchet pinions 54 are mounted on fixed pins, as in Fig. 1, and have secured thereto or integral therewith pinions 99. Each pinion 99 is between the teeth of the two gears 98 and is of slightly less diameter than the space between said teeth. By suitable mechanism such as a lever 100 having a pin or pins engaging the annular groove in the rod 96, said rod 96 can be shifted in the direction of its length so as to carry all of the wheels and the pairs of gears 98 so that the motion imparted to the wheels will be in one direction or the other according to which gear 98 is in engagement with pinion 99. The pinion 99 is a rotary driving member, and the driven member comprises the wheel 30, and the hub 97 presents two sides (gears 98), either one of which is shiftable into engagement with the driving member 99.

In Figs. 17, 18 and 19 the structure is substantially the same as in Fig. 15 so far as concerns the wheels 30, hubs 97 and gears 98, but these members, instead of being shiftable with their supporting rod, are merely rotatable thereon, as in Fig. 1. In other words, the said wheels and their hubs and gears are not shiftable laterally, being mounted on a cylindrical rod 31.

In Fig. 17 a pinion 101 has its stud 102 provided with a flexible connection 103 with the upper end of ratchet pinion 54 so that rotary motion will be imparted to pinion 101 in the same manner as described in connection with Fig. 1. The stud 102 is mounted in a bar 104 which is shiftable in the direction of its length by suitable means which may be similar to the lever 100 in Fig. 15, so that the pinion 101 can be moved to shift the driving engagement from one side to the other of the driven member 30, 97, 98.

In Fig. 18 the structure is substantially the same as in Fig. 17, but instead of the flexible connection 103 we provide a universal joint 105.

In Fig. 19 the shiftable pinion 101 has no movement relatively to the ratchet pinion 54, but said members 101 and 54 rock upon a foot bearing 106 so that the bar 104 can shift the driving engagement from one side to the other of the member 30, 97, 98.

In Figs. 20 and 21 an elongated pinion 38$^a$ is mounted upon a fixed pin 55 and is connected to or integral with the ratchet pinion 54. In this case it is the driven member 30 that is moved to shift the engagement. Each wheel 30 is mounted upon a stud 107 of an offset arm 108 secured to or integral with a short shaft 109 mounted in a frame bar 110. The shafts 109 have the arms 111 connected by a longitudinal adjustable bar 112 so that by moving said bar in the direction of its length it will rock the wheels 30 relatively to the axes of the shafts 109 to shift the driving engagement of member 38$^a$ from one side to the other of the toothed portion 35 of wheel 30.

In Fig. 22 the structure is substantially the same as in Fig. 1, excepting that instead of the hub 37 connecting the two pinions 38, we may provide a single elongated pinion 38$^b$ which, when vertically adjusted as described in connection with Fig. 1, will shift the driving engagement from one side to the other of the rotary member 30, 35.

It is to be understood of course that each form illustrated in Figs. 14 to 22 inclusive is adapted for use in calculating mechanism, as well as the form shown in Figs. 1 to 7.

When our invention is embodied in a calculating machine as illustrated and described herein, the mechanism provides a plurality or series of counters or indicators, either one of which is moved or actuated by devices which are capable of advancing or retracting either counter or indicator so as to show an increased or diminished indication, each counter or indicator being controllable a predetermined amount of movement. Each counter or indicator (excepting, of course, the one at the extreme left) is capable of automatically causing independent actuation of the next counter or indicator at the left in either direction to show an increased or diminished indication equal to one part in ten. Such automatic independent actuation of the counter or indicator at the left occurs at the time when the one which causes such actuation is passing from 9 to 0 for addition, or from 0 to 9 for subtraction. This is performed or effected without any connection with or movement of any counter or indicator at the right of the one which is causing the actuation toward the left.

Having described our invention, what we claim is:

1. In mechanism of the character described, a wheel having projections, means for intermittently rotating said wheel, a pivoted stop arm adapted to be moved to and from position in the path of one of the wheel projections, a curved arm movable with the pivoted stop arm, said curved arm having a recess, and a swinging frame having a resetting member adapted to be engaged with said wheel, said swinging frame having an arm to engage the recess of said curved arm.

2. In mechanism of the character described, a wheel and means for intermittently actuating said wheel, said means including an actuating rack bar, a pinion engaged by said rack bar, a ratchet pinion, a pawl movable with the first mentioned pinion and engaging the ratchet pinion, and a lock movable with the rack bar to engage a tooth of the ratchet pinion to prevent overmotion thereof.

In testimony whereof we have affixed our signatures, in presence of two witnesses.

EDWARD H. PALMER.
WILLIAM S. KINSLEY.

Witnesses:
A. W. HARRISON,
P. W. PEZZETTI.